July 21, 1931.   E. W. SCHELLENTRAGER   1,815,681
RECORDING MACHINE
Filed March 20, 1926   2 Sheets-Sheet 1

Inventor
Eugene W. Schellentrager
By Brockett + Hyde
Attorneys

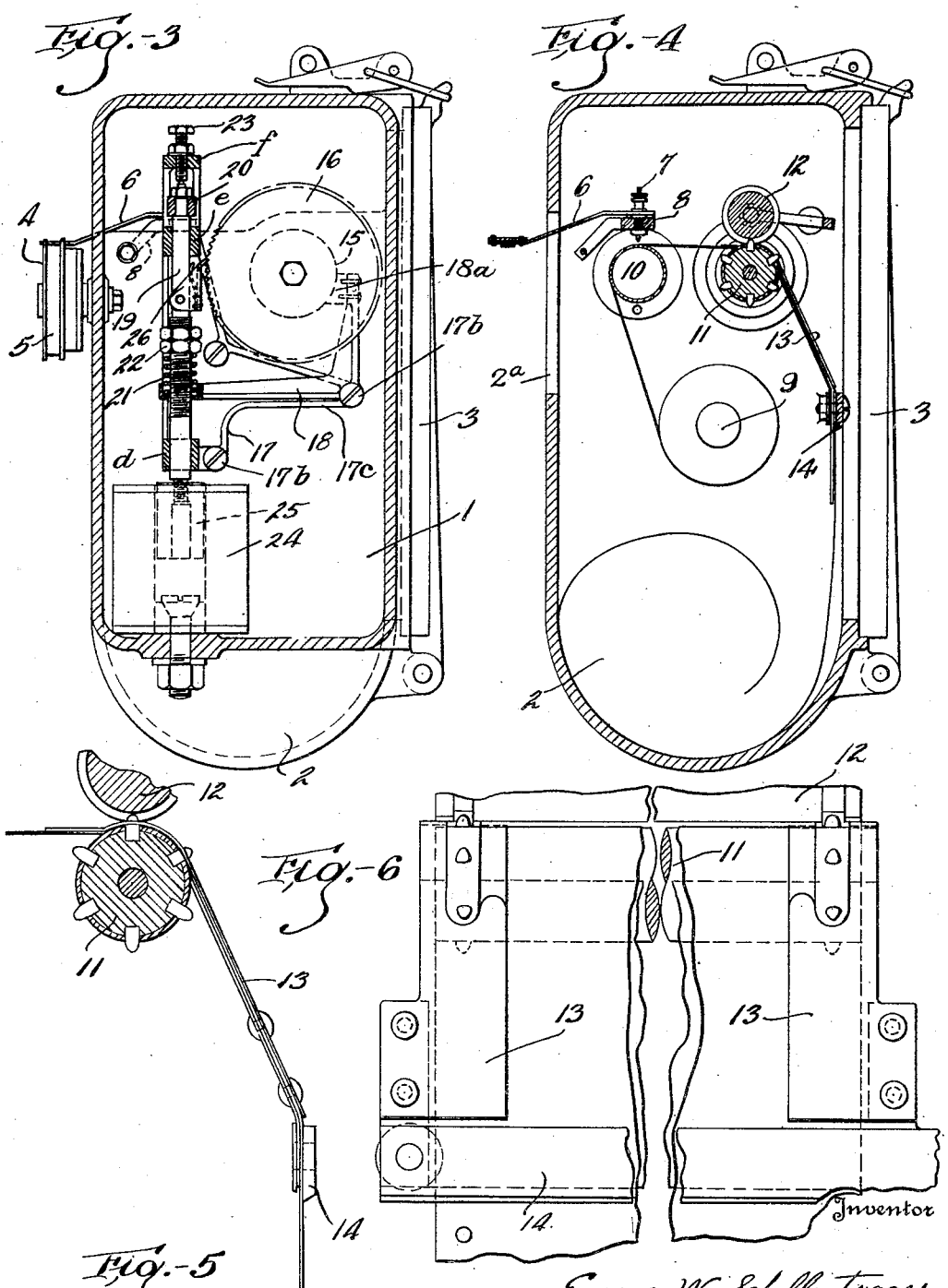

Patented July 21, 1931

1,815,681

UNITED STATES PATENT OFFICE

EUGENE W. SCHELLENTRAGER, OF CLEVELAND HEIGHTS, OHIO, ASSIGNOR TO THE ATLAS BOLT & SCREW COMPANY, OF CLEVELAND, OHIO, A CORPORATION OF OHIO

RECORDING MACHINE

Application filed March 20, 1926. Serial No. 96,212.

This invention relates to a recording machine intended for use with an indicator such as a weighing indicator employed in connection with railroad cars, charging trucks or other conveyors or containers wherein various ingredients in particular proportions by weight are brought together or various portions by weight of the loads therein are to be discharged.

The objects of this invention are generally improvements over the recording mechanism disclosed in Patent No. 1,329,567 of Feb. 3, 1920, to Samson D. Wright, and consist in providing increased simplicity and ruggedness of construction, improved accessibility and positiveness of operation, and to these ends to provide an arrangement of parts grouped in operative units which may be preassembled before placing in the device and easily removed therefrom if necessary in its maintenance. The exact nature of these improvements will be apparent from the following description taken in connection with the accompanying drawings, in which:

Figure 2:
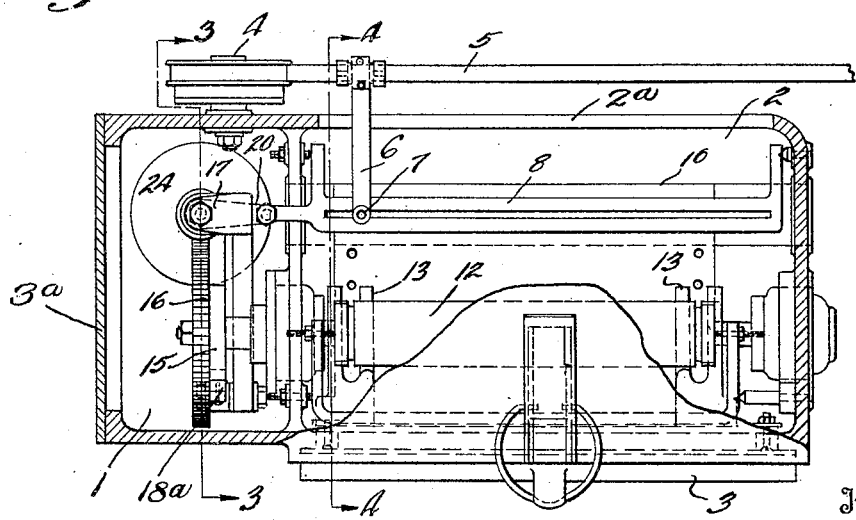
Fig. 2 is a similar plan view of the same machine.

Figs. 3 and 4 are side elevations in section along lines 3—3 and 4—4 respectively of Fig. 2.

Figs. 5 and 6 are sectional and front elevations respectively, showing details of tractor mechanism employed in the machine.

The principal parts of the recorder are a stylus or needle, laterally movable responsive to the indicator whose reading is to be recorded; a record adapted to receive impressions by the needle; and means for causing the needle to make impressions in the record when a record is desired of the indicator reading, and including a means for advancing the record after each impression of the needle.

Figure 1:
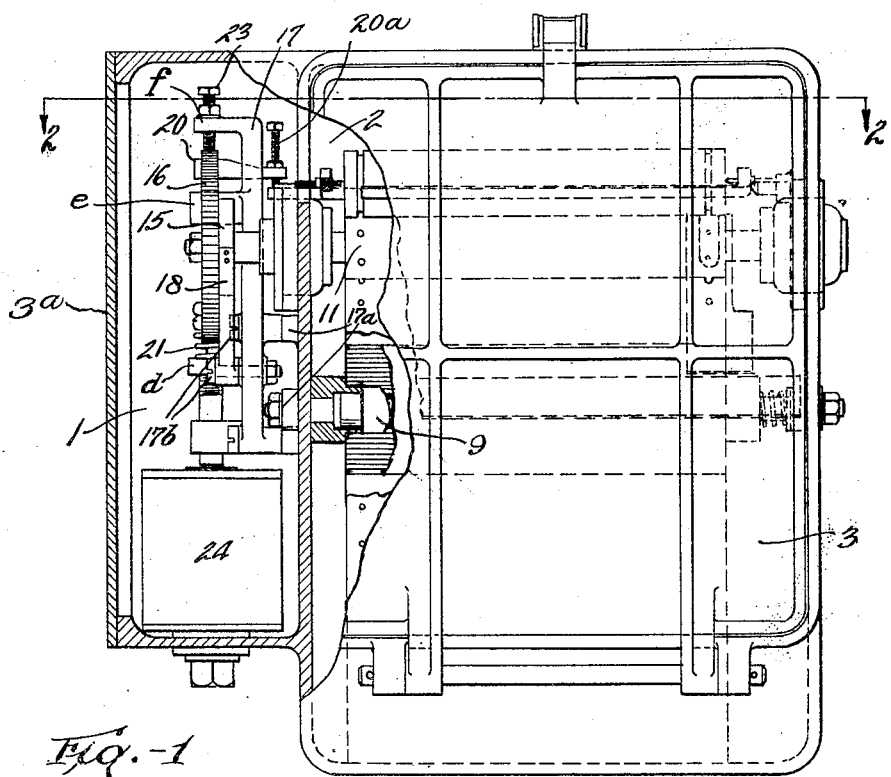
Fig. 1 is a front elevation of a machine embodying my improvements, parts being broken away to show interior construction.

The parts thus broadly described are enclosed within a casing, divided by a vertical partition into compartments 1 and 2. Compartment 2 is comparatively wide and is provided upon its front face with an inspection door opening of considerable area, as shown in Fig. 1, and which is normally closed by an openable door or cover 3 hinged at its bottom, and at its back with a laterally extending slot 2a whose purpose will appear. The door opening is for the purpose of affording ready means for inspecting the record at any time, said record being always presented parallel with or flatwise to the door opening. Said opening also affords access to the interior of the casing, either to reach the parts in the upper portion thereof, or to reach the rolled record as it collects in the bottom of the casing below the door opening. The lower part of the casing is of semi-cylindrical form, and depends below the door opening and serves to automatically guide the paper record and curl or wind it upon itself into more or less loose roll form, as indicated in Fig. 4. The side of the smaller compartment 1 is closed by a cover plate 3a whereby its contents are easily accessible, and carries upon its back a pulley 4 in alignment with another pulley mounted at the same level upon the indicating device hereinafter referred to but not shown. Over these pulleys passes a thin, flexible, endless steel tape 5 carrying a light spring needle arm 6 fixed at right angles thereto and carrying upon its free end a needle 7. It is evident that angular motion of the drive pulley upon the indicator will be thus transmitted and transferred into lateral motion of the needle. Along the line of motion of the needle 7 is a slotted needle guide 8 pivoted at its ends, and its slot engaging flanges upon the needle; the arrangement being such that by angular motion of the needle guide the needle may be forced downward to perforate the record sheet beneath it as hereinafter described.

Centrally located and extending across the compartment 2 is mounted a removable cylinder 9 carrying a rolled strip of paper upon which it is intended that the record be made. Directly under the needle 8 is a hollow perforating cylinder 10, provided, in the path of the needle as it is swung downward by means of the needle guide 8, with a longitudinal slot; whereby regardless of the lateral position of the needle, the paper record strip passing over the perforating cylinder may be punctured to indicate the position of the needle.

Forward of the perforating cylinder is a tractor cylinder 11 provided at its ends with regularly spaced tractor pins for engagement with corresponding perforations extending along the side of the record strip. Maintained in alignment by a hinged yoke, and resting upon the tractor cylinder is a weighted follower cylinder 12, provided with peripheral grooves at its ends to clear the projections of the tractor cylinder and whose function is to maintain the record strip in contact with the tractor cylinder particularly adjacent its tractor pins.

Extending forward and downward the width of the record sheet is a double apron 13, between the members of which the record strip passes upon leaving the tractor cylinder. The upper member of the apron is in two pieces laterally spaced so that the record strip is visible between them and each piece extending over the tractor cylinder and slotted to clear the pins thereon. The lower member is notched to clear the pins, but extends tangentially only up to the cylinder, and is provided at its lower extremity with a knife edge 14 useful in cleanly tearing off the depending used portion of the record strip.

The bottom of the compartment 2 is semicircular in longitudinal section as shown in Fig. 4, whereby the paper record strip emerging from the apron 13 and further advanced by the tractor cylinder 11, retaining sufficient of its curl from its original tight winding upon the cylinder 9, will of itself form a loose roll resting within the semicircle and increasing in size as the record strip advances. All of the cylinders described are parallel and longitudinally coextensive, and turn upon bearings mounted in the side walls of the compartment 2.

From the foregoing it is apparent that the progress of the record strip will be from the cylinder 9 over the perforating cylinder 10, between the tractor and follower cylinders 11 and 12, downward through the apron 13 and beyond the knife edge 14, which extends horizontally across the door opening about midway of its height; thence downward across the open gap between the knife edge and the bottom of the door opening, and thence downwardly into the depending semi-cylindrical extension of the casing where it is coiled or curled into roll form, as before described; advancement of the record strip being controlled by the tractor cylinder 11, perforated entries upon the strip being controlled by the needle guide 8, and the quantitative or significant position of the perforations being controlled by the instantaneous reading of the indicating device to which the recording machine is connected. The depending portion of the recording strip beyond the cylinder 11 and knife edge 14 lies at the front of the casing just behind the door 3 and is conveniently positioned for inspection by opening the door or even without opening the door, if the latter is provided with the customary glass window.

The axis of the tractor cylinder 11 extends through the partition already described, and into the compartment 1 where a brake wheel 15 is mounted upon it. The brake wheel carries a hub upon which is removably fitted a ratchet wheel 16 so that when assembled, in effect the tractor cylinder, brake wheel and ratchet wheel comprise an integral unit.

Within the compartment 1 upon bosses 17a of the partition a bracket 17 is secured by screws 17b, said bracket being provided with a forwardly extending arm 17c upon which is pivoted a two armed or bell crank brake lever 18, and three laterally extending arms d, e, f, through which are coaxial vertical bores. In the lower two arms d, e is slidably mounted and guided a ratchet post 19. The top of the ratchet post carries an arm 20 laterally extending through a slot in the guide 8, the relation between the ratchet post and the needle guide being adjustable by a set screw 20a upon the end of the arm 20 and loosely contacting the needle guide.

Midway upon the ratchet post is a coil spring 21 mounted below the adjusting nuts 22 upon a threaded portion of the ratchet post and seated in a recess upon one arm of the brake lever through which the ratchet post extends. Upon the other arm of the brake lever is a brake shoe 18a resting upon the brake wheel. Thus the spring 21 both maintains the brake shoe against the brake wheel, and yieldingly supports the ratchet post in its guides in the bracket.

Upon the bottom of compartment 1 in alignment with the ratchet post is mounted a solenoid 24 electrically connected in a circuit arranged to be energized by the operator of the device when it is desired to make a record of the reading upon the indicator with which the recording machine is connected. To the bottom of the ratchet post 19 is secured an armature 25 extending within the solenoid so as to be operable thereby. Pivotally mounted upon the ratchet post opposite the ratchet wheel 16 is a pawl 26 spring pressed to engagement with the ratchet wheel.

The arrangement of the parts within the compartment 1 will be seen to comprise a mechanism for actuation of the record strip perforating and advancing mechanism.

When the solenoid 24 is energized the armature 25 is induced into it, lowering the ratchet post against the spring 21, and idly retracting the pawl over the ratchet. The post motion transmitted through the arm 20 causes the needle 7 to perforate the record strip.

Through the lever 18 the brake shoe is always pressed lightly against the brake wheel, to hold the tractor cylinder steady. When the ratchet post is lowered, however, an additional force is applied to the lever through the spring, thus increasing the pressure upon the brake wheel to prevent any possibility of movement of the tractor cylinder during the downward stroke of the post.

Upon deenergizing of the solenoid 24 the ratchet post rises under the action of the spring 21 and the pawl 26 being in engagement with its ratchet wheel is advanced and causes a partial revolution of the wheel and therefore of the tractor cylinder 11 to advance the record strip, the stroke of the ratchet post and therefore the amount of rotation of the tractor wheel being governed by the setting of the adjusting screw 23, adjustable in the upper arm *f* of the bracket 17 to limit the upward motion of the ratchet post.

It is to be noted that the ratchet post and parts immediately connected therewith are all mounted upon the bracket 17 and forming a unit therewith which may be preassembled and installed or removed from the machine with ease. The operable position of the brake lever is covered by the ratchet wheel, which is therefore made separable from the brake wheel as already described.

The mechanism described is quite compact as compared with prior devices for the same purpose. The operating rod 19 is slidably mounted opposite the edge of and in the plane of the ratchet wheel and the actuator for said rod is in axial alinement therewith. Also, the brake lever has its braking portion alongside the inner face of the ratchet wheel, which is on the end of the tractor cylinder 11 and outside of the braking surface 15. All of these parts are accessible through the end opening covered by door 3*a*, and the paper record, needle guide 8 and other parts are accessible through the front opening or gap above the knife 14. Also, when the door 3 is opened it hangs down below its opening and when the hand is inserted into the semi-cylindrical record receptacle at the bottom of the casing and the record is withdrawn it hangs down below the door opening in front of the depending door, which acts as a shield or guard for the record until it is torn off at the knife.

Having thus illustrated and described my invention what I claim is:

1. In a recording machine, a casing provided in one of its walls with an inspection door opening, a door for said opening, means for supporting a rolled record sheet in said casing with its axis parallel to the plane of the door opening, and means for guiding the sheet downwardly across and generally parallel with the opening to present the sheet flatwise thereto, the lower part of the casing being of semi-cylindrical form and depending below said opening to automatically coil the sheet as it feeds beyond the opening.

2. In a recording machine, a casing provided in its front wall with an inspection door opening, a door for said opening, a knife extending horizontally across said opening intermediate its upper and lower edges, means for supporting a rolled record sheet in said casing with its axis parallel to the knife, and means for guiding the sheet downwardly past the knife so that it depends and is exposed flatwise at the opening, the lower part of the casing being of semi-cylindrical form and depending below said opening to automatically coil the sheet as it feeds beyond the opening.

3. In a recording machine, a casing, a rotatable tractor member having a ratchet wheel and a braking surface, a bracket removably mounted in said casing, an operating rod slidably mounted in said bracket in the plane of the ratchet wheel, a pawl for said ratchet carried by said rod, a lever pivoted on said bracket and provided with a brake shoe cooperating with said braking surface, a spring supported by said lever and supporting said rod, said spring always tending in one direction to lightly apply the brake and in the other direction to advance the pawl and turn the ratchet, and means in the casing in endwise alinement with the rod for moving the same in the spring compressing direction to increase brake applying pressure and retract the pawl over the ratchet, said bracket and all parts carried thereby in assembled form being removable as a unit from the casing.

4. A recording machine of the character described in claim 3, in which the ratchet wheel is located on the end of the tractor member and is removable therefrom and the braking surface is of smaller diameter than the ratchet wheel and is located inwardly thereof, whereby upon removal of the ratchet wheel said bracket and the parts carried thereby are removable as a unit, as stated.

In testimony whereof I hereby affix my signature.

EUGENE W. SCHELLENTRAGER.